(12) United States Patent
Shroff et al.

(10) Patent No.: US 12,432,555 B2
(45) Date of Patent: Sep. 30, 2025

(54) MULTI AP MICROBRANCH DEPLOYMENT CONFIGURATION BASED ON OPTIMIZED PACKET FORWARDING

(71) Applicant: Hewlett Packard Enterprise Development LP, Spring, TX (US)

(72) Inventors: Nilay Shroff, Karnataka (IN); Piyush Agarwal, Santa Clara, CA (US); Mohan Ram Bhadravati Ramakrishna Bhat, Karnataka (IN); Narayanasami Vijayaraghavan, Karnataka (IN); Shreekanthayya Hiremath, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 251 days.

(21) Appl. No.: 18/300,950

(22) Filed: Apr. 14, 2023

(65) Prior Publication Data
US 2024/0349046 A1 Oct. 17, 2024

(51) Int. Cl.
G06F 21/00 (2013.01)
H04W 12/06 (2021.01)
H04W 12/088 (2021.01)

(52) U.S. Cl.
CPC ......... *H04W 12/06* (2013.01); *H04W 12/088* (2021.01)

(58) Field of Classification Search
CPC .............................. H04W 12/088; H04W 12/06
USPC ............................................................ 726/6
See application file for complete search history.

(56) References Cited

U.S. PATENT DOCUMENTS

| | | |
|---|---|---|
| 7,249,177 B1 | 7/2007 | Miller |
| 7,447,166 B1 | 11/2008 | Kaluve et al. |
| 8,584,209 B1 | 11/2013 | Borapura et al. |
| 8,612,606 B2 | 12/2013 | Jagannatharao et al. |
| 8,767,526 B1 | 7/2014 | Jagannatharao et al. |
| 10,230,654 B2 | 3/2019 | Cariou et al. |
| 2002/0110123 A1* | 8/2002 | Shitama ............... H04L 63/08 370/389 |
| 2003/0018703 A1* | 1/2003 | Huitema ............... H04L 61/10 709/202 |
| 2004/0133806 A1 | 7/2004 | Joong et al. |
| 2007/0150732 A1* | 6/2007 | Suzuki ................ H04W 12/06 713/168 |
| 2008/0201454 A1 | 8/2008 | Soffer |
| 2009/0119504 A1 | 5/2009 | Van Os et al. |

(Continued)

*Primary Examiner* — Josnel Jeudy
(74) *Attorney, Agent, or Firm* — Sheppard Mullin Richter & Hampton LLP

(57) ABSTRACT

Systems and methods are provided for authenticating client devices in microbranch deployment. In response to a client device connecting to a LAN AP, a first client-entry associated with the client device can be created to indicate that the client device is local to the LAN AP. An authentication request can be transmitted to a WAN AP to be forwarded to an authentication server. A second client-entry associated with the client device at the WAN AP can be created based on the authentication request. Upon successful authentication, the second client-entry can be designated as being foreign to the WAN AP based on the first client-entry being local to the LAN AP. Accordingly, data packets from the client device can be analyzed via a first firewall of the LAN AP, while bypassing a second firewall of the WAN AP based on the foreign designation of the second client-entry at the WAN AP.

15 Claims, 9 Drawing Sheets

(56) References Cited

U.S. PATENT DOCUMENTS

| | | | |
|---|---|---|---|
| 2010/0042846 A1* | 2/2010 | Trotter | H04L 63/104 235/375 |
| 2010/0067631 A1* | 3/2010 | Ton | H04L 67/51 375/358 |
| 2015/0222601 A1* | 8/2015 | Metz | H04L 63/0823 726/5 |
| 2019/0141071 A1* | 5/2019 | Heilig | H04L 45/70 |
| 2020/0322380 A1 | 10/2020 | Sheth et al. | |
| 2021/0099873 A1* | 4/2021 | Windsor | H04L 63/0892 |
| 2023/0254243 A1* | 8/2023 | Vysotsky | H04L 67/141 370/389 |

* cited by examiner

MULTI AP MICROBRANCH DEPLOYMENT CONFIGURATION BASED ON OPTIMIZED PACKET FORWARDING

BACKGROUND

An Access Point (AP) provides configuration settings and accessibility for network devices to connect to a wired, communication network. The AP may be a wired AP or wireless AP, where each of the network devices can connect to the AP directly instead of using wires to connect to the internet service provider (ISP) to reach the wired, communication network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
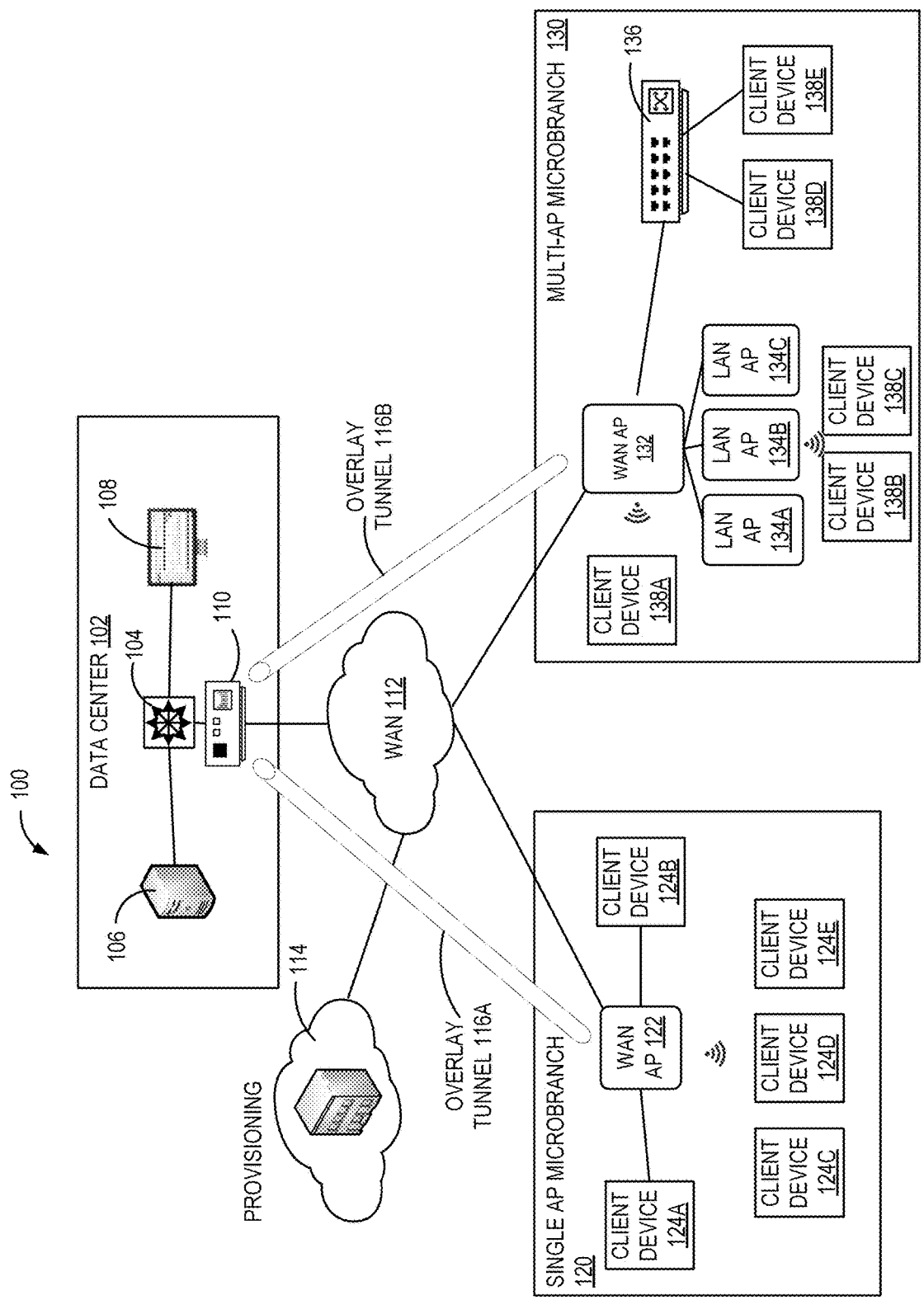
FIG. 1A illustrates an example system implementing microbranch deployment.

The figures are not exhaustive and do not limit the present disclosure to the precise form disclosed.

DETAILED DESCRIPTION

Multi-AP microbranch deployment refers to enabling APs in remote sites to be configured and managed by a cloud platform. In conventional systems, a client device can connect to a Local Area Network (LAN) AP, which would forward data packets to an overarching Wide Area Network (WAN) AP. A software defined wide area network (SD-WAN) allows a network administrator to connect branch locations to a core site over a wide area network (WAN). The use of software defined networking (SDN) decouples network traffic decisions from the various devices within the network, such as routers, switches, bridges, and other common network devices. This decoupling essentially turns each networking device into a simple packet forwarding device. The WAN AP can set the potential traffic paths through each network device based on client policies (e.g., QoS requirements, bandwidth, etc.) to connect the branch locations within the WAN AP to the core site or data center (DC), which is provided to each network device over a control channel. Instead of making a decision on how to route traffic when data is received, the network devices simply execute the route identified by the WAN administrator.

A traditional branch deployment supports client connectivity requirements across different geographical locations for various types of business operations. The sites in remote geographical locations serve as branch offices, while the headquarters or main office serves as a DC that hosts network resources to store, manage, and distribute data. The main office also hosts a centralized Virtual Private Network (VPN) management system to aggregate traffic from the remote branch sites. For micro branch deployments, there is no need for a dedicated gateway device. Instead, a single gateway AP (WAN AP) can be used as a WAN-facing gateway. Additional APs may be added "under" the WAN AP to extend wireless coverage in the micro branch deployment. APs can refer to a network device that allows a wireless-compliant device, such as a client device, station (STA), etc. to connect to a wired network. Thus, an AP essentially functions as an extension mechanism from an existing wired network to a community of wireless client devices. It should be understood that gateways typically refer to APs that have network address translation (NAT) routing and dynamic host control protocol (DHCP) server capabilities.

In micro branch deployments, the WAN AP "owns" the public IP address, provides gateway/gateway-similar functionality (e.g., DHCP, NAT, routing, etc. capabilities), and may further host a VPN client for providing secure connectivity to a remote (e.g., main office) DC or other cloud service(s) based on the needs of the micro branch. Configuration between the WAN AP of a micro branch deployment and any additional APs are typically different because their respective roles in a micro branch deployment differ.

Once data packets are transmitted from the LAN AP to the WAN AP, the client device can receive access to either the internet or a DC. In a multi-AP microbranch deployment, client traffic is forwarded through a WAN-facing AP. If a client device connects to a LAN (non-WAN) AP, data packets would first be firewalled at the LAN AP before transmitting to the WAN AP. At the WAN AP, the client packets would be firewalled again before it is routed to the internet.

An example of this type of firewalling can be seen in Instant Access Point (IAP) swarm designs. IAP swarm designs comprise one or more member IAPs that connect to a conductor IAP. The member IAPs comprise LAN APs or other subnetworks that connect to the conductor IAP. The conductor IAP can comprise the overarching WAN AP or other general network. Inbound firewall rules on the conductor IAP are created for each client device based on its IP subnetwork. For every client IP subnetwork there could be multiple rules added to the inbound access control list (ACL). Here, the ACL refers to the firewall and security requirements a client device must satisfy before access is granted. The incoming client traffic from any member IAP in the swarm must run through inbound ACL rules on the conductor IAP. Based on the fulfillment of the ACL rules, the client packet can be routed to the internet or can be tunneled to the DC. The issue with this approach is that the inbound ACL is the same for all client devices connected to a member IAP. The inbound ACL is also the same for internet traffic received from a conductor IAP uplink port. Moreover, inbound ACL rules automatically increase when a new IP subnetwork or route is formed. This is because the inbound ACL rules are updated based on the new IP subnetwork or route. As a result, the ACL rules list can become burdensome. As inbound ACL rules are auto-expanded for each client subnet and route, the list of ACL rules can quickly increase. Henceforth in a slow-path, client packets or uplink packets received from member IAPs could consume a lot of time processing on the conductor IAP. This is because the packet must run through a huge list of inbound ACL rules. As there's no visibility of a user role for client devices connected to a member IAP, the same inbound ACL rules are applied for any traffic incoming from the conductor IAP uplink port.

The result is as follows: in an IAP swarm, when a client device connects to a member IAP and sends traffic, it is first firewalled by the member IAP and then forwarded to the conductor IAP. When the client packet ingresses to the conductor IAP, it's subjected to the inbound ACL (firewall) rules. The inbound ACL rules are then matched against the client traffic and used to select the destination (internet or tunnel). Furthermore, if any routing changes are made in the system or if new client subnets are added in the system, then the inbound ACL rules are reprogrammed and auto-expanded. The issue with this auto expansion is that the conductor IAP could potentially run out of the fixed number of available ACL rule slots. As each client (connected to a member IAP) packet as well as packets received from the IAP's uplink runs through the inbound ACL list, it adds an extra overhead on the conductor IAP and degrades the conductor IAP performance.

Examples of the present disclosure resolve this dual firewall by recording the user role and allowing client devices to skip applying inbound ACL/firewall rules. By eliminating the dual firewall, processing time and traffic overhead can decrease to optimize the conductor IAP's performance. It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The examples disclosed herein can comprise one or more LAN APs that connect to a WAN AP before transmitting traffic to the internet or DC. The LAN AP can be designated as the client device authenticator. The WAN AP can be configured to be a RADIUS-proxy that transmits an authentication request to a RADIUS server. Here, a RADIUS-proxy refers to a system that forwards requests to a RADIUS server based on predefined rules. The RADIUS server can authenticate the request with a RADIUS protocol. Once the client device is authenticated, the client device can be designated as foreign to the WAN AP, meaning that the data packets originated from a LAN AP prior to transmitting to the WAN AP. The client device can be designated as local to the LAN AP, as it originated from the LAN AP. This designation can allow the client device to bypass the second firewall at the WAN AP.

If the client device originates at the WAN AP, the WAN AP can comprise the client device authenticator. The client device can be authenticated by the RADIUS server and designated as local to the WAN AP. This designation can indicate that the client device still needs to pass ACL rules at the WAN AP. The WAN AP can bypass foreign designations and authenticate local designations so that the client device is only firewalled once at either the LAN AP or WAN AP. These designations are applicable to multiple LAN APs connected to the WAN AP. The WAN AP does not need to distinguish which LAN AP the client device originated from, as the foreign designation is sufficient to indicate that the client device has already been authenticated.

One advantage to this configuration is the use and location of the WAN AP in the network route. In conventional configurations, the WAN AP can be connected at the edge of the branch. As the client device connects to the WAN AP, the WAN AP may be responsible for subsequent routing based on its position in the branch. This can turn the WAN AP into a bottleneck for data packets due to the breadth of its ACL rules. The examples described herein allow all client traffic in the branch to bypass this bottleneck and streamline client device processing. Furthermore, unlike the IAP swarm design, the examples described reduce the delays caused by processing a large set of unnecessary inbound ACL rules. If a user has configured hundreds of available routes, the total ACL rules for all routes can be extreme. Similarly, if hundreds of clients in the branch use different IP subnets, the total ACL rules can also drastically increase. Adding user visibility of each client device to the WAN AP helps to limit the number of inbound ACL rules. Limiting these rules further reduces packet processing overheads on the conductor IAP.

Before describing embodiments of the disclosed systems and methods in detail, it is useful to describe an example micro branch deployment network with which the systems and methods disclosed might be implemented in various applications. FIG. 1A illustrates one example of a network 100 that includes micro branch deployments. In this example, network 100 may comprise a data center 102 to which a single AP micro branch deployment 120 and a multi-AP micro branch deployment 130 are operatively connected. Also part of network 100 is a provisioning system, e.g., a cloud-based zero-touch provisioning system/service 114. As noted above, WAN 112 allows the various elements/entities of network 100 to be interconnected.

As alluded to above, data center 102 may be representative of an enterprise main office. Data center 102 may include a controller or core switch 104 to which a DHCP server 106 and a policy management platform 108 are operatively connected. It should be understood that depending on how a connection between data center 102 and a remote branch (in this example, micro branches 120, 130) is implemented, the functionality of element 104 may differ, Some virtual LANs may be Layer 3-routed, in which case, a VPN concentrator may send traffic flows to a core switch, e.g., core switch 104 which can be high speed core switch. Core switch 104 may then route the packets of the flows to the requisite, subsequent hop. Alternatively, in the context of virtual LANs that are Layer 2-connected, the VPN concentrator may simply route GRE packets (described below) to a controller, which in this case, would be element 104 also functioning as a controller.

As would be understood by those skilled in the art, DHCP server 106 can refer to a network element that dynamically assigns an IP address and other network parameters to each device on the network. Policy management platform 108 may be implemented to safely/properly connect devices, such as client devices, to a network. For example, policy management platform 108 may provide new device onboarding, grant varying levels of access to the network, maintain network security, etc.

As further illustrated in FIG. 1A, data center 102 is connected to micro branch 120 via an overlay tunnel 116A. As noted above, VPN tunnels can be established between sites, in this case, data center 102 and micro branch 120 to create an SDWAN overlay network. In particular, overlay tunnel 116A may connect WAN AP 122 of micro branch 120 to a headend gateway 110, which may act as a VPN concentrator and overlay terminator (using, e.g., a generic routing encapsulation (GRE) tunneling protocol) for terminating VPN tunnels, in this instance, overlay tunnel 116A, thereby providing routing from micro branch 120 into data center 102. Similarly, micro branch 130 (which, in contrast to micro branch 120, is a multi-AP micro branch including WAN AP 132 and leaf LAN APs 134A-134C) may be operatively connected to data center 102 via overlay tunnel 116B.

Micro branch 120 is a single AP micro branch, where one or more client devices, such as client devices 124A-E may associate to an AP, e.g., WAN AP 122 (wirelessly or via wired connection), to allow connectivity to data center 102. Micro branch 130 is a multi-AP micro branch, where, in this example, multiple LAN APs 134A-134C are operatively connected to WAN AP 132 through which connectivity to data center 102 may be effectuated. Micro branch 130 may include one or more client devices, e.g., client devices 138A-C, each of which may associate directly to WAN AP 132 or to one of LAN APs 134A-134C. In this example, micro branch 130 may further include an unmanaged switch 136 to which additional client devices, e.g., client devices 138D-E connect.

Figure 1B:
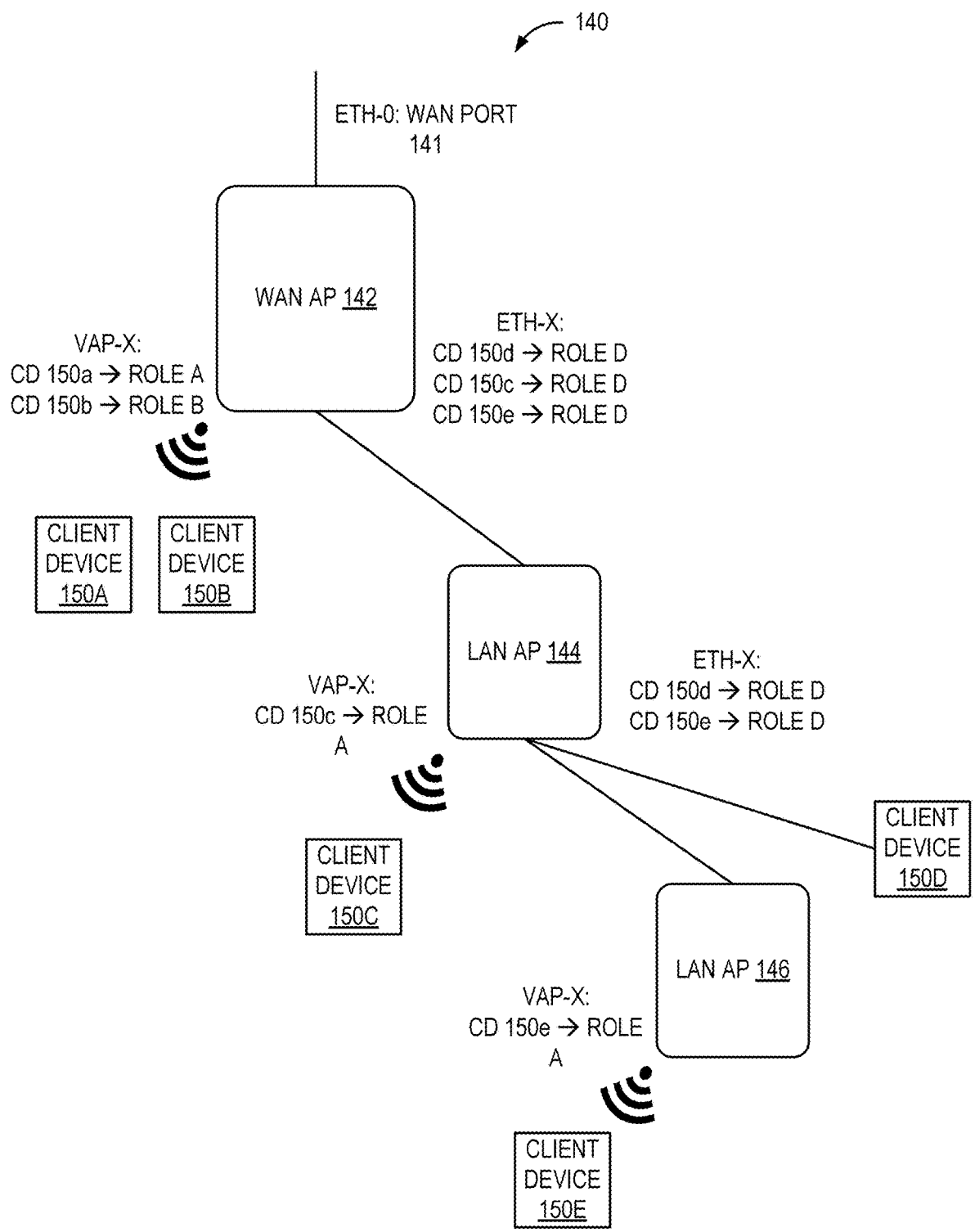
FIG. 1B illustrates another example system implementing microbranch deployment.

Referring now to FIG. 1B, another micro branch deployment 140 is illustrated, where micro branch deployment 140 has a daisy chain topology/hierarchy with respect to its APs. As noted above, in a micro branch deployment, such as micro branch deployment 140, there is no need for a dedicated gateway. Instead, a WAN AP, e.g., WAN AP 142 acts as a WAN-facing gateway, and in this example, may be connected over an Ethernet connection (Eth-0) via a WAN port 141 of WAN AP 142. A first AP, LAN AP 144, may be operatively connected to WAN AP 142, and in turn, a second AP, LAN AP 146, may be operatively connected to LAN AP 144, i.e., LAN APs 144 and 146 are daisy chained to WAN AP 142.

As illustrated in FIG. 1B, two client devices 150a and 150b, e.g., a laptop, a phone, a printer, or other computing device may be wirelessly associated to WAN AP 142. In this example, WAN AP 142 may be configured to operate as a plurality of virtual APs (VAPs). As would be understood by those skilled in the art, VAPs simulate multiple APs on a single physical AP. Each VAP may have its own unique service set ID (SSID) thereby segmenting a WLAN into multiple broadcast domains. Security can be customized/configured to control wireless client device access. In this example, when client device 150a connects to WAN AP 142, it may be designated a particular user role. It should be understood that every client device in network, e.g., network 100 (FIG. 1) to which micro branch deployment 140 may be operatively connected, is associated with a user role. That user role determines that client device's network privileges, frequency of re-authentication, applicable bandwidth contracts, and so on. In this example, client device 150a (from the perspective of WAN AP 142) is associated with a user role, role A. A second client device associated to WAN AP 142, i.e., client device 150b, may have its own associated user role in the eyes of WAN AP 142, role B.

With respect to LAN AP 144 of micro branch deployment 140, a client device 150c, which again, can be a laptop, phone, other user/client device, etc. may be associated to a VAP (VAP-X) configured on LAN AP 144. Client device 150c may be associated with a user role, role A, from the perspective of LAN AP 144. However, given that LAN AP 144 is connected to/"under" WAN AP 142, from WAN AP 142's perspective, client device 150c may be associated with a user role, role D. It should be understood that user roles can be assigned in a variety of ways based on network configuration. In some embodiments, an assigned user role can refer to a static role (combined with a port) such that all client devices that are connected to the same port/VAP may be assigned the same user role. Alternatively, user role derivation may be used, which can be based on client device attributes, such as MAC address, connected port, etc. Moreover, it should be understood that a user role can refer to a policy container, where typically, different policies may be configured for different roles, although it is possible to configure the same policy for different user roles. Typically, different user roles may be assigned to APs, wired client devices, and wireless client devices. Another client device 150d may be associated to LAN AP 144, this time, over an Ethernet connection, and can be assigned a user role, role D. Yet another client device 150e may be associated to a VAP (VAP-X) of LAN AP 146, and may be assigned its own user role, role A.

Given that LAN AP 146 is daisy chained to WAN AP 142 through LAN AP 144, LAN AP 144 may also assign a user role to client device 150e, in this example, role D (like client device 216). Moving up the chain to WAN AP 142, WAN AP 142 "sees" each client device associated to LAN APs 144 and 146, and may thus assign each of those client devices, a particular user role, in this case, client device 150d (associated to LAN AP 144), role D. WAN AP 142 may also assign client device 150e (associated to LAN AP 146) a user role, i.e., role D. It can be appreciated that the privileges, e.g., firewall policy, may not necessarily be consistent across all the APs (WAN AP 142, LAN AP 144, LAN AP 146). It should also be appreciated that LAN AP 146, LAN AP 144, and WAN AP 142 are connected over a wired connection, e.g., Ethernet, and respective user roles assigned to those client devices that are associated with daisy chained APs, are served by an Eth-X server (which can serve both its own connected, wired client devices as well as any other wired/wireless clients served by a downlink AP. A VAP-X server typically only serves wireless client devices connected to a VAP port.

To address this firewall inconsistency conventionally, a network administrator can remove port ACL policies for the wired (Eth-X) ports. For example, a network administrator can configure all wired ports to operate in a TRUST mode, or configure a "permit-all" port ACL in order to allow the firewall process for those wired ports. However, although firewall inconsistencies are addressed, configuring wired ports in this way can result in a potential security risk for the network. For example, an attacker may connect a client device, such as a laptop, to one of a daisy chained APs' wired ports. Because the wired port is operating in TRUST mode, or allows the firewall process to be bypassed without performing authentication of the client device, that attacker will be able to access the micro branch deployment network 140. This in turn allows the attacker full network access up to a main office network (e.g., data center 110 of FIG. 1A), as well as other branch networks, e.g., micro branch networks 120, 130 (FIG. 1A).

Another conventional mechanism for avoiding firewall inconsistencies is to chain authentication and use role derivation, using for example, RADIUS authentication. For example, when client device 150e connects to an AP, e.g., LAN AP 146, RADIUS authentication can be triggered immediately on the connected wireless SSID (VAP-X), and a user role, e.g., role A, can be derived. When client device 150e's packet(s) reach an "up-layer" AP, here LAN AP 144, RADIUS authentication could again be triggered for the same client device, client device 150e, on LAN AP 144's wired port (Eth-X). Accordingly, the same user role could be derived and applied to LAN AP 144's wired port. When a packet of client device 150e reaches WAN AP 142, the same authentication and user role derivation can occur. Although firewall processing remains consistent across the APs (and WAN AP), redundant authentication transactions are introduced, and extra flow processing time is incurred.

Figure 1C:
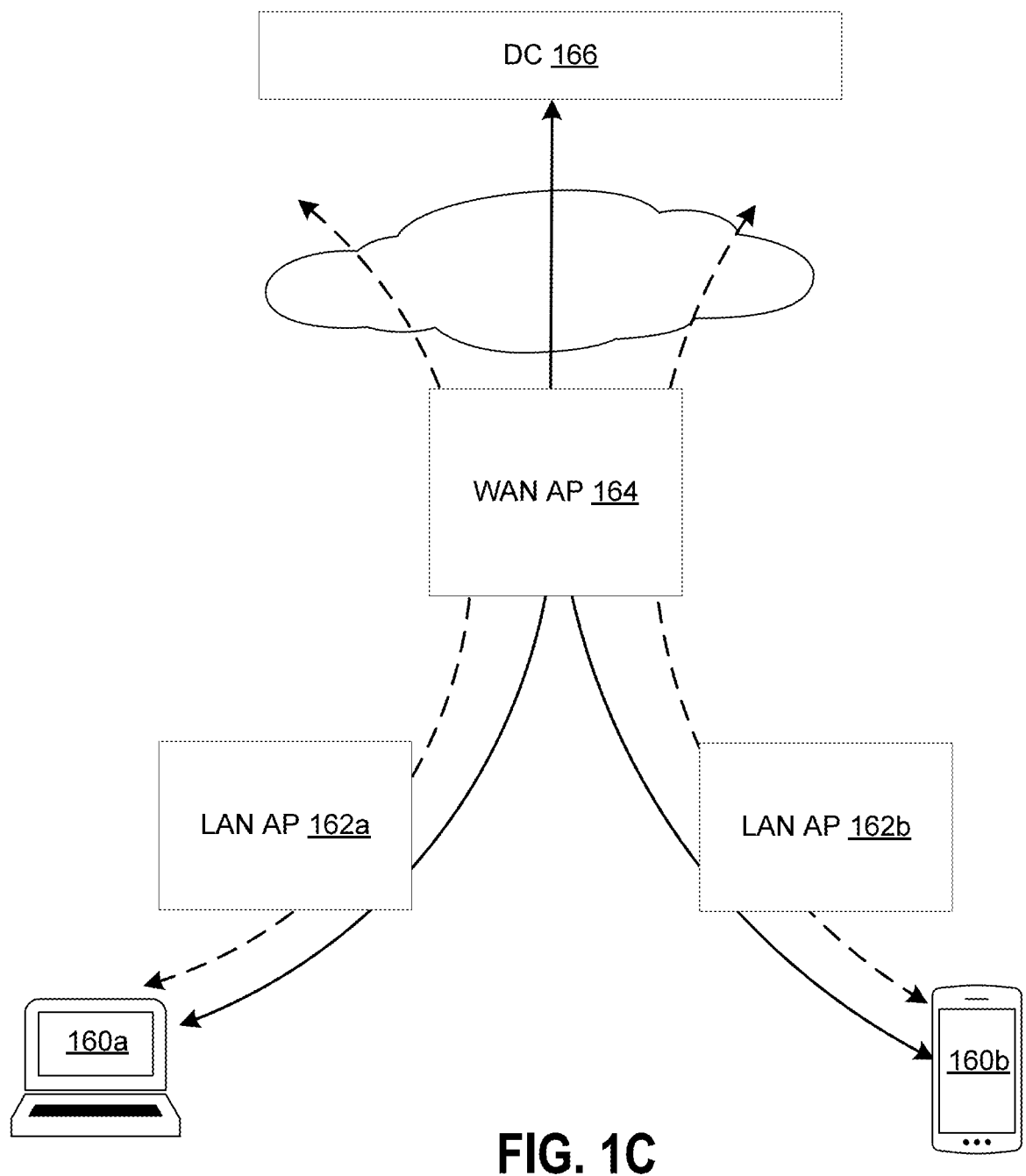
FIG. 1C illustrates an example system for forwarding client traffic through a LAN AP and WAN AP.

FIG. 1C illustrates an example system for authenticating client devices at the LAN AP. Client devices 160 can connect to one or more LAN APs to be forwarded to the internet. Client devices 160 can comprise laptops, smartphones, desktops, or any device capable of connecting to the internet. Illustrated in FIG. 1C is a laptop 160a and a smartphone 160b. In the example of FIG. 1C, there are two LAN APs 162 that client devices can connect to. Laptop 160a can connect to LAN AP 162a, and smartphone 160b can connect to LAN AP 162b. The solid line arrow path indicates that the client device is being routed to the DC, whereas the broken line arrow path indicates that the client device is being routed to the internet.

Client devices 160 can be authenticated at LAN APs 162. LAN APs 162 can implement any inbound ACL rules or any necessary firewalls to authenticate client devices 160. Once the client devices 160 are authenticated, LAN APs 162 can transmit the data packets to WAN AP 164. In traditional systems, at WAN AP 164, the data packets would be firewalled a second time before being forwarded. As described above, WAN AP 164 can implement any and all inbound ACL rules. From WAN AP 164, data packets can be forwarded either to the internet (as indicated by the broken line arrows) or forwarded to DC 166. DC 166 can comprise a branch office, headquarters, or main office that hosts network resources to store, manage, and distribute data. The main office can also host a centralized VPN management system to aggregate traffic from the remote branch sites. Data packets can be transmitted to DC 166 through a GRE or IPsec tunnel of the WAN. Here, IPsec tunnels refer to the related protocols that tunnel data between devices at the network layer. The paths illustrated at FIG. 1C can flow from client devices 160 to the end point (either DC 166 or the internet) in either direction as necessary to facilitate the communication.

Figure 1D:
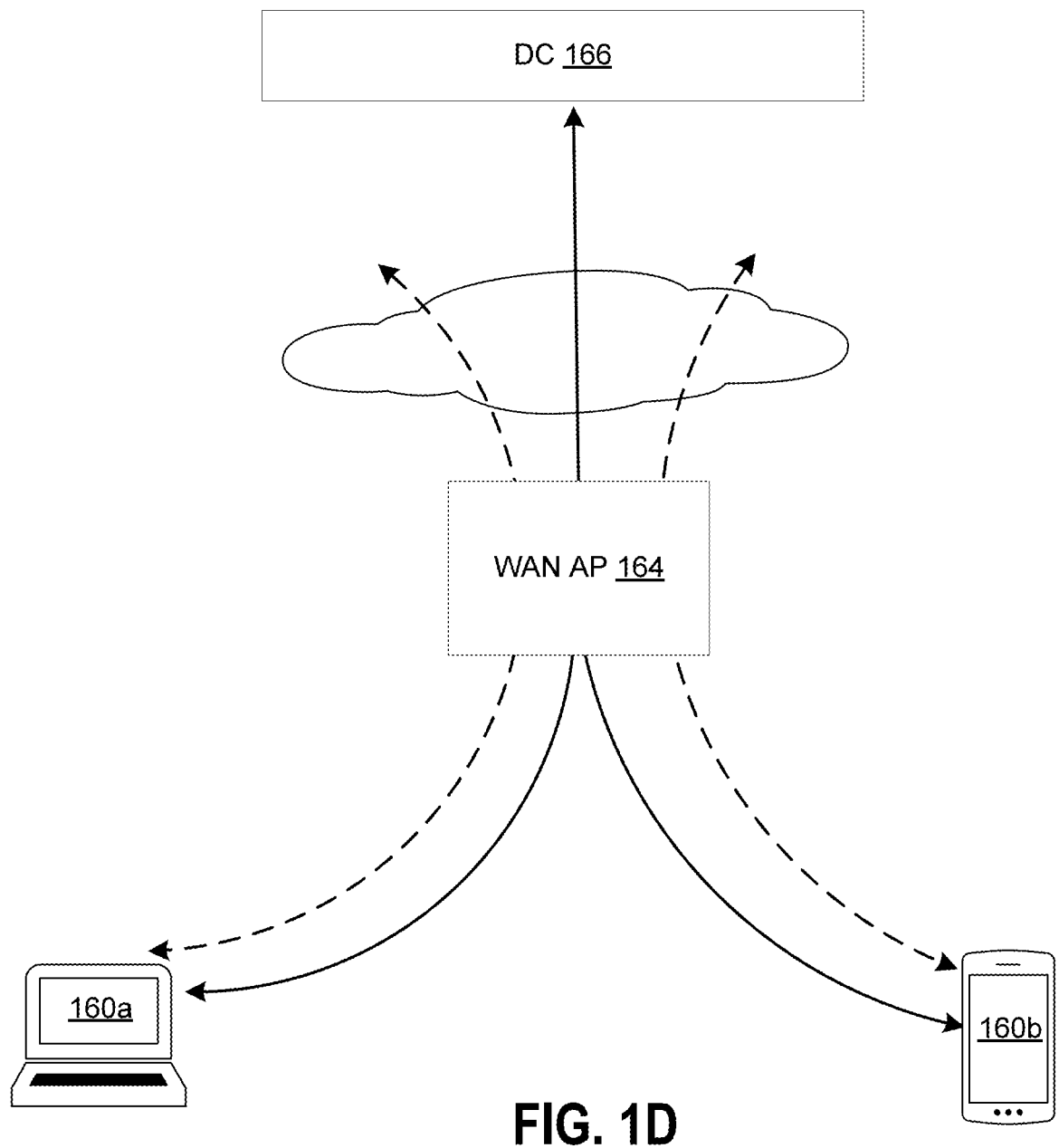
FIG. 1D illustrates an example system for forwarding client traffic through a WAN AP.

FIG. 1D illustrates another example system similar to that of FIG. 1C, except that the client devices 160 can connect directly to WAN AP 164 instead of through LAN APs. Here, client devices 160 can transmit data packets directly to WAN AP 164. WAN AP 164 can authenticate client devices 160. As described further below in FIG. 3, this functionality is maintained with the implementation of the RADIUS server. WAN AP 164 can forward the authenticated data packets either to the internet or to DC 166. As with FIG. 1C, data packets can be forwarded to DC 166 through GRE or IPsec tunnels.

Figure 2:
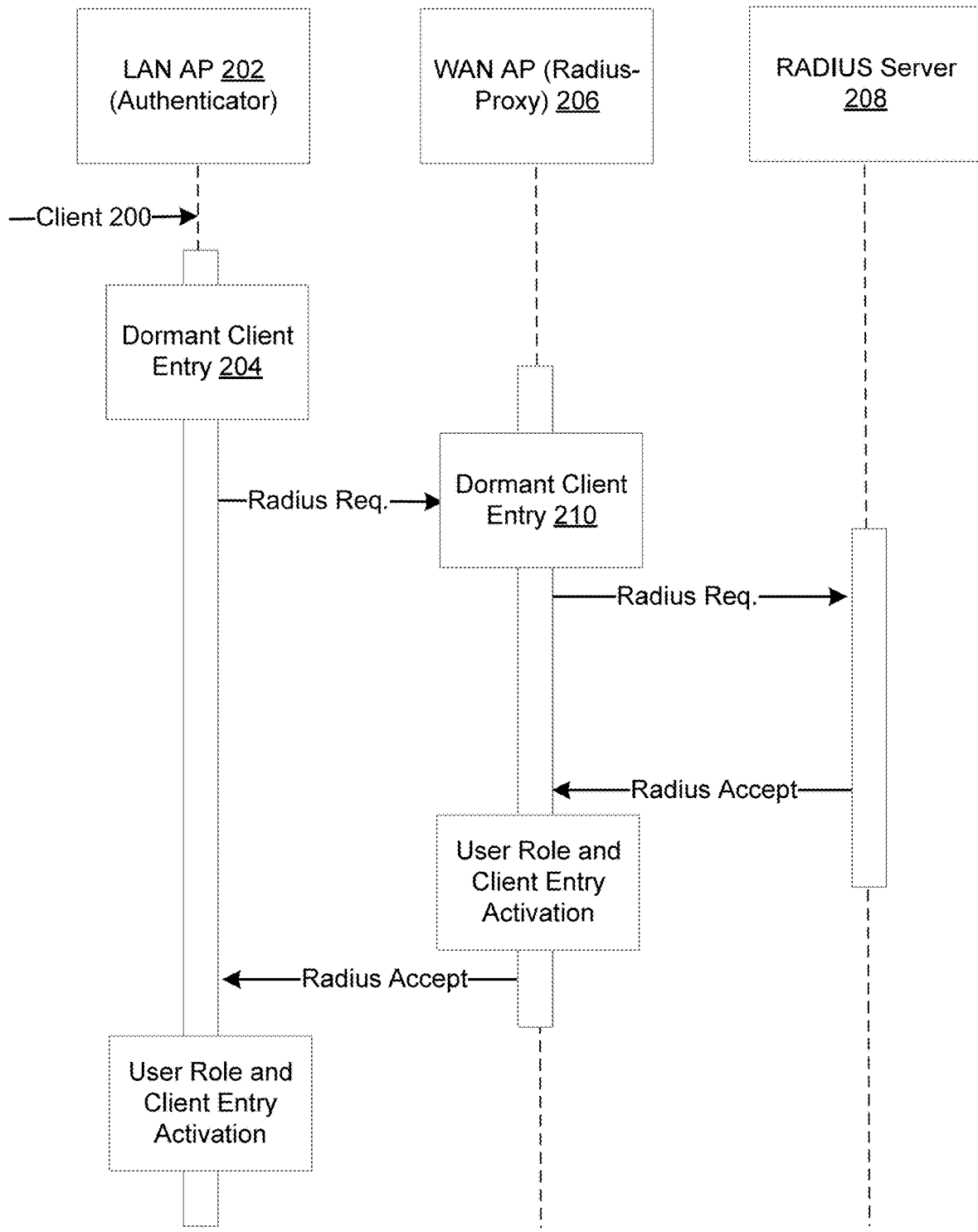
FIG. 2 illustrates an example system for authenticating client-entries passing through a LAN AP and a WAN AP.

FIG. 2 illustrates an example workflow in accordance with the examples described herein. A client device 200 can connect to LAN AP 202 and transmit data packets to LAN AP 202. These data packets can provide client device 200 with access to the internet or DC. LAN AP 202 can be designated as the client device authenticator as it is the first AP client device 200 connects to. Upon connection to LAN AP 202, LAN AP 202 can create a dormant client-entry 204 to identify the client. Client-entry 204 can maintain a dormant state until authentication at the RADIUS server is complete, after which client-entry 204 can activate. Client-entry 204 can comprise any identifying information about client device 200 and/or its users. Client-entry 204 can indicate situational data about client device 200, such as the network path client device 200 has taken. Client-entry 204 can indicate that the data packets originated at LAN AP 202. This client-entry can be designated as local to LAN AP 202 and accordingly, can be designated as foreign to WAN AP 206.

LAN AP 202 can send a RADIUS request to WAN AP 206. Here, WAN AP 206 can be designated as the RADIUS-proxy. As described above, as the RADIUS-proxy, WAN AP 206 can transmit the RADIUS request to RADIUS server 208 for authentication. Upon receiving the RADIUS request from LAN AP 202, WAN AP 206 can make a second corresponding client-entry 210 corresponding to client device 200. The second corresponding client-entry can also maintain as dormant state as with the first client-entry. WAN AP 206 can transmit the RADIUS request to RADIUS server 208 or any authentication server. RADIUS server 208 can authenticate the RADIUS request and transmit a notice to WAN AP 206 that the RADIUS request has been accepted. WAN AP 206 can download the user role associated with second client-entry 210 and activate the client-entry. The user role can comprise corresponding authentication information of the client device and indicate the status of client-entry 210. That user role can determine that client device's network privileges, frequency of re-authentication, applicable bandwidth contracts, and so on. As described above, in some embodiments, an assigned user role can refer to a static role (combined with a port) such that all client devices that are connected to the same port/VAP may be assigned the same user role. Alternatively, user role derivation may be used, which can be based on client device attributes, such as MAC address, connected port, etc. A user role can refer to a policy container, where typically, different policies may be configured for different roles, although it is possible to configure the same policy for different user roles.

The active client-entry can be marked as foreign to WAN AP 206 based on the accepted RADIUS request. As described above, the foreign designation indicates that the client device does not need to be firewalled again at WAN AP 206. The RADIUS acceptance can be further transmitted back to LAN AP 202. At LAN AP 202, the user role associated with the first client-entry can be downloaded and the first client-entry can be activated. As with the second client-entry, downloading the user role can indicate the status of the client-entry and the progress to authenticate the client device. Therefore, after authentication, both the first and second client-entries for the client device can be active to permit access to client device 200. The use of the RADIUS server can allow a client device to authenticate only once. Because the client-entry at WAN AP 206 is active and designated as being foreign, client device 200 would not need to be firewalled at WAN AP 206. Client device 200 can bypass WAN AP 206 and forward data packets either to the internet or to a DC as described above in FIG. 1A. As described above, bypassing WAN AP 206 can comprise skipping firewall rules or fast-forwarding the client forwarding packets.

Figure 3:
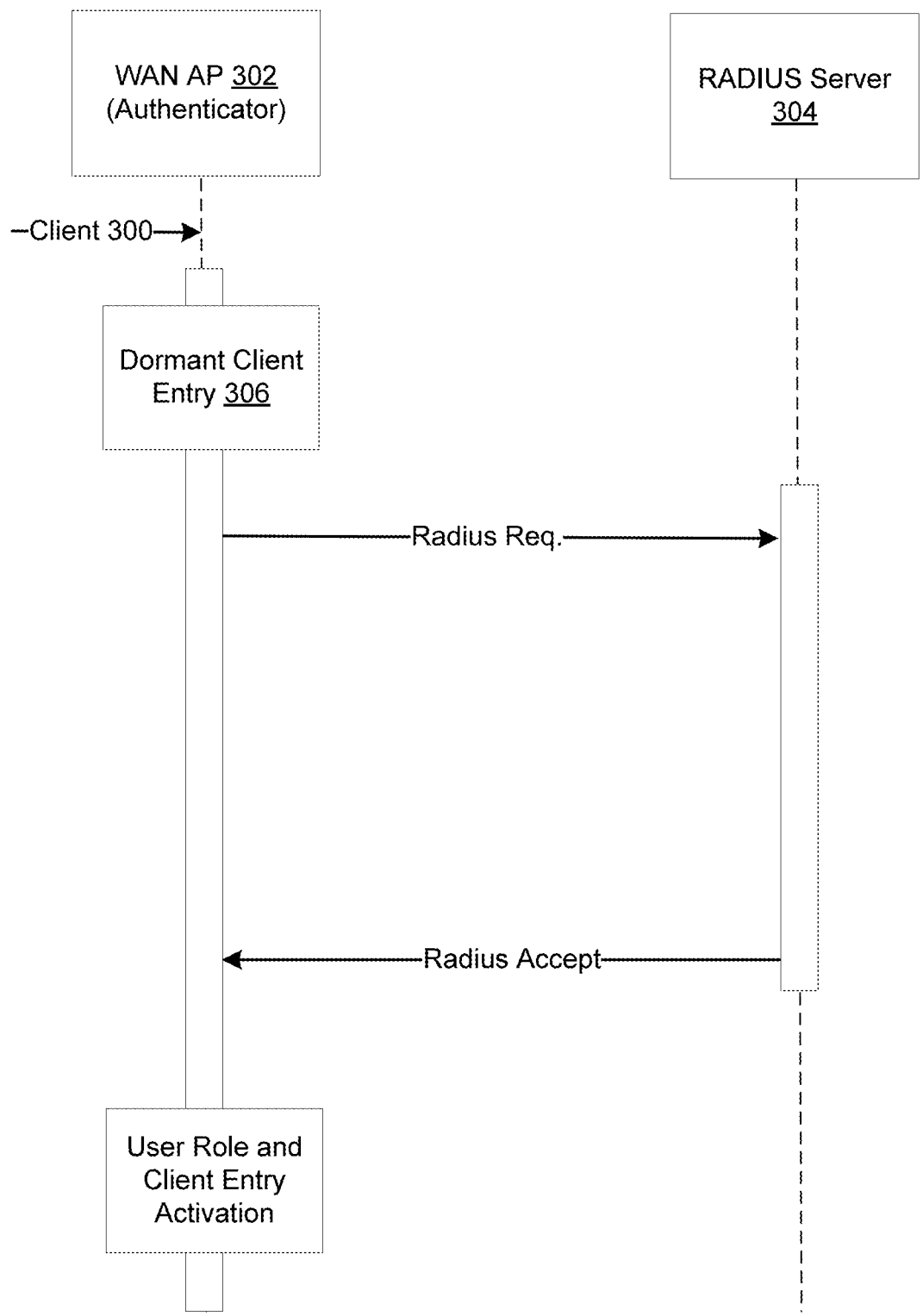
FIG. 3 illustrates an example system for authenticating client-entries passing through a WAN AP.

FIG. 3 illustrates another example workflow where the client device connects first to the WAN AP. In FIG. 3, client device 300 can be transmitted to WAN AP 302. As opposed to the workflow of FIG. 2, WAN AP 302 can serve as the client device authenticator. As described above, WAN AP 302 can transmit a RADIUS request to RADIUS server 304 for authentication. WAN AP 302 can also create a dormant client-entry 306. RADIUS server 304 can authenticate the RADIUS request and transmit acceptance to WAN AP 302. As with the system in FIG. 2, WAN AP 302 can download the user role for dormant client-entry 306 and activate the client-entry. However, dormant client-entry 306 can be designated as local to WAN AP 302. This designation indicates that the client device originally connected to WAN AP 302 and has not been previously authenticated. The local designation indicates that WAN AP 302 should not bypass the data packets. WAN AP 302 can apply the ACL rules or any corresponding firewall policy to authenticate the client device. As a result, client device 300 can connect to the internet or DC with one round of authentication at WAN AP 302.

Various combinations of one or more LAN APs and WAN APs can be used to implement the systems described in FIGS. 2 and 3. Each LAN AP and WAN AP can identify local versus foreign traffic and apply firewalls accordingly. For example, a WAN AP may receive data packets from a plurality of client devices. Client entries associated with each client device can indicate whether the client device is local or foreign. The WAN AP can distinguish what has already been authenticated and bypass some or all of the data packets. The WAN AP would accordingly apply appropriate firewall rules to the remaining data packets that have not been authenticated, i.e. at a previous LAN AP. Accordingly, each client device can be authenticated once regardless of where its connection originates. Furthermore, data packets may pass through more than one LAN AP before arriving at the WAN AP. Corresponding client entries can be created at each AP to indicate whether the client device is local or foreign to the particular AP. Foreign traffic may be fast-forwarded past subsequent LAN APs because the client device was previously authenticated at the first LAN AP. Ultimately, the first device a client device connects to can comprise the client device authenticator. Subsequent APs or devices can comprise RADIUS-proxies to transmit the RADIUS request to the RADIUS server for authentication.

Figure 4A:
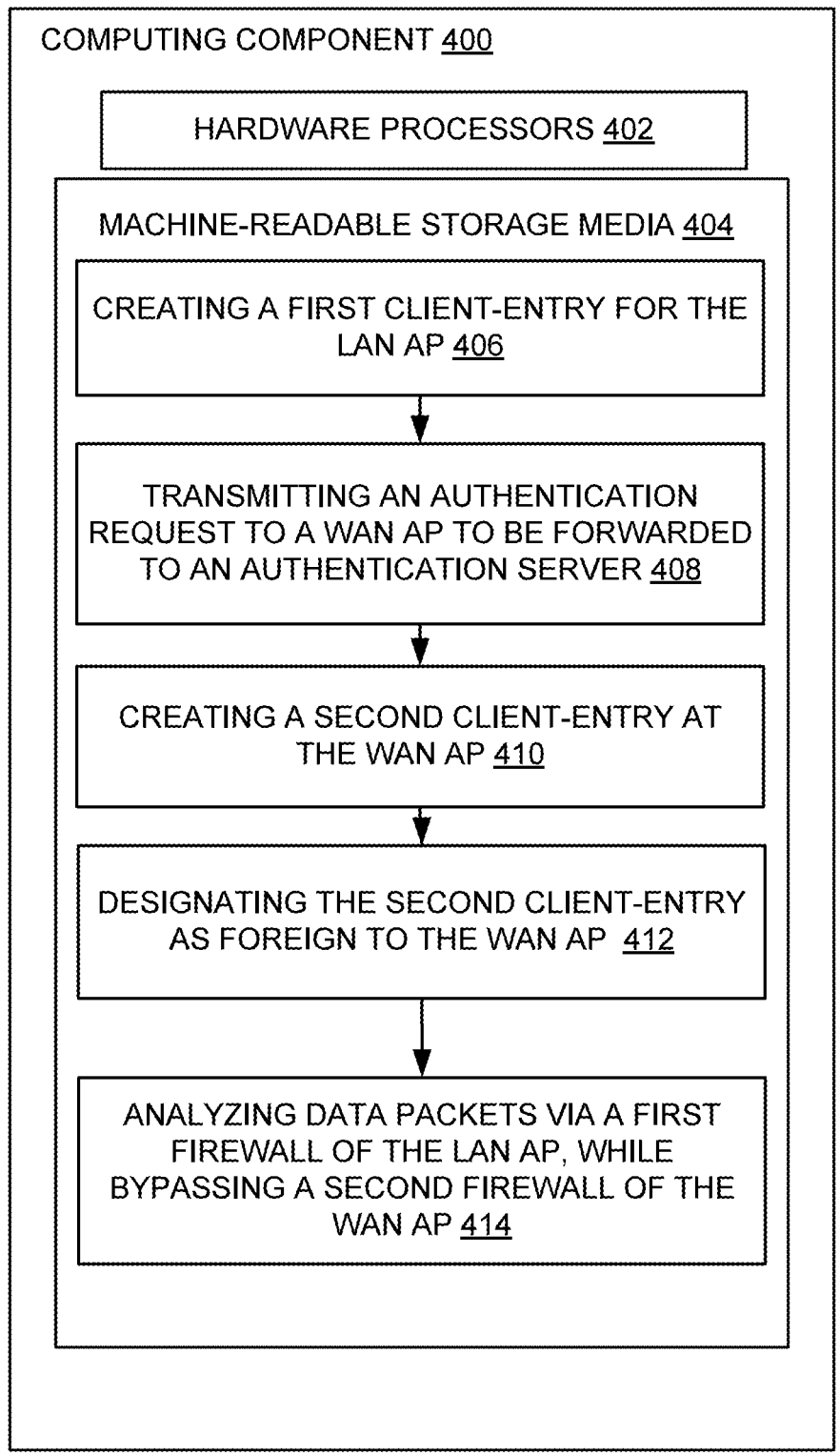
FIG. 4A illustrates a first example method in accordance with the embodiments described herein.

FIG. 4A illustrates an example computing component that may be used to authenticate client devices in accordance with various embodiments. Referring now to FIG. 4A, computing component 400 may be, for example, a server computer, a controller, or any other similar computing component capable of processing data. In the example implementation of FIG. 4A, the computing component 400 includes a hardware processor 402, and machine-readable storage medium 404.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-414, to control processes or operations for authenticating client-entries. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-414.

Hardware processor 402 may execute instruction 406 to, in response to a client device connecting to a LAN AP, create a first client-entry associated with the client device for the LAN AP. The LAN AP can comprise a client device authenticator as described above (e.g. in FIG. 2). As described above, the LAN AP can create a dormant client-entry to identify the client. The client-entry can be activated when an authentication request is accepted at an authentication server. The client-entry can comprise any identifying information about the client device and/or its users. The dormant client-entry can indicate that the data packets originated at the LAN AP. This client-entry can be designated as local to the LAN AP.

Hardware processor 402 may execute instruction 408 to transmit an authentication request to a WAN AP to be forwarded to an authentication server. As described above, the authentication request may comprise a RADIUS request with RADIUS protocols. The authentication server can be a RADIUS server that can authenticate a client device based on the request. The authentication server can be any authentication server with any set of protocols to authenticate client devices. The WAN AP can be configured to be a RADIUS-proxy that transmits the authentication request to the RADIUS server. Any subsequent APs after the client device authenticator can comprise RADIUS-proxies to transmit the RADIUS request to the RADIUS server.

Hardware processor 402 may execute instruction 410 to create second client-entry associated with the client device at the WAN AP based on the authentication request. As described above, this client-entry can comprise a second corresponding client-entry corresponding to the client device. This client-entry can also be dormant before authentication at the authentication server occurs. The second client-entry can indicate the client device's relationship to the WAN AP.

Hardware processor 402 may execute instruction 412 to designate the second client-entry as being foreign to the WAN AP upon successful authentication of the client device. As described above, the authentication server can authenticate the authentication/RADIUS request and transmit a notice to the WAN AP that the request has been accepted. The WAN AP can download the user role associated with the second client-entry and activate the client-entry. The active client-entry can be marked as foreign to the WAN AP based on the accepted authentication request. Furthermore, the acceptance can be further transmitted back to the first LAN AP. At the first LAN AP, the user role associated with the first client-entry can be downloaded and the client-entry can be activated. Because the client-entry at the WAN AP is active and designated as foreign, the client device would not need to be firewalled at the WAN AP.

Hardware processor 402 may execute instruction 414 to analyze data packets from the client device via a first firewall of the LAN AP, while bypassing a second firewall of the WAN AP. This bypassing of the second firewall can occur based on the foreign designation of the second client-entry at the WAN AP. As described above, the client device can bypass the WAN AP and forward data packets either to the internet or to a DC as described above in FIG. 1A. As described above, bypassing WAN AP 206 can comprise skipping firewall rules or fast-forwarding the client forwarding packets.

Figure 4B:
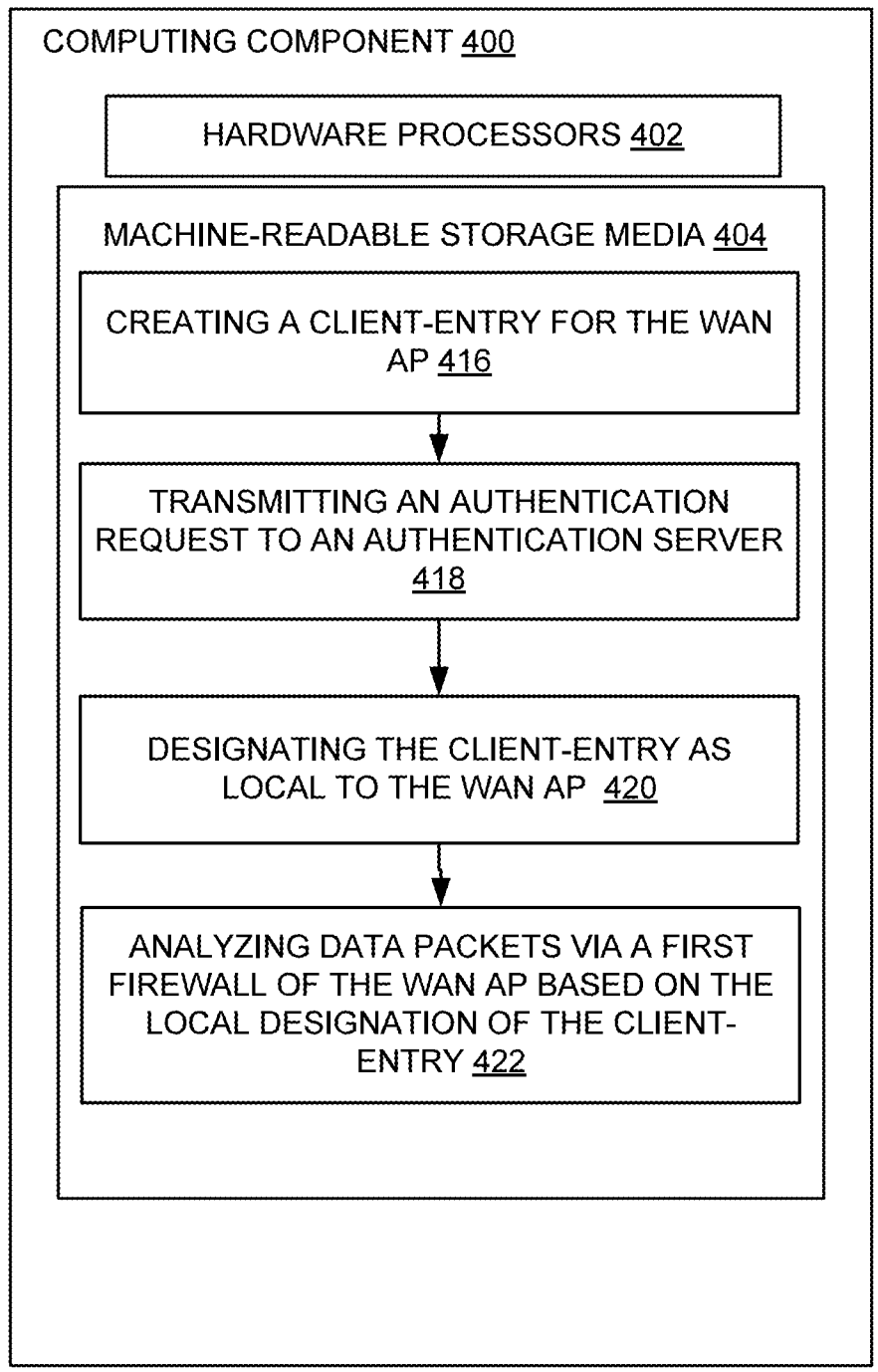
FIG. 4B illustrates a second example method in accordance with the examples described herein.

FIG. 4B illustrates computing component 400 while executing instructions 416-422 to authenticate client-entries at the WAN AP. Hardware processor 402 may execute instruction 416 to create a client-entry associated with a client device for the WAN AP in response to the client device connecting to the WAN AP. Here, the WAN AP can comprise the client device authenticator, as illustrated in FIG. 3. As described above, the WAN AP can create a dormant client-entry to identify the client device. The dormant client-entry can indicate that the data packets originated at the WAN AP.

Hardware processor 402 may execute instruction 418 to transmit an authentication request from the WAN AP for authenticating the client to an authentication server. Instead of forwarding the request to the authentication server as described in FIG. 4A, the WAN AP can generate the authentication request as the client device authenticator and transmit it directly to the authentication server.

Hardware processor 402 may execute instruction 420 to designate the client-entry as local to the WAN AP upon successful authentication of the client device. As described above, the authentication server can authenticate the authentication request and transmit acceptance to the WAN AP. The WAN AP can download the user role for the dormant client-entry and activate the client-entry. The designation as local can indicate that the client device originally connected to the WAN AP and has not been previously authenticated. The local designation can indicate that the WAN AP should not bypass the data packets. WAN AP can apply corresponding firewall policies or ACL rules to authenticate the client device.

Hardware processor 402 may execute instruction 422 to analyze data packets from the client device via a firewall of the WAN AP based on the local designation of the client-entry at the WAN AP. As described above, the client device can be authenticated once before forwarding to the internet or a DC. The WAN AP may apply firewall rules to client devices designated as local while bypassing client devices designated as foreign. The WAN AP can keep track of the client traffic using the corresponding user-role of the active client-entry. Accordingly, regardless of where a client device initially connects, the WAN AP can facilitate one round of authentication to forward data packets successfully.

Figure 5:
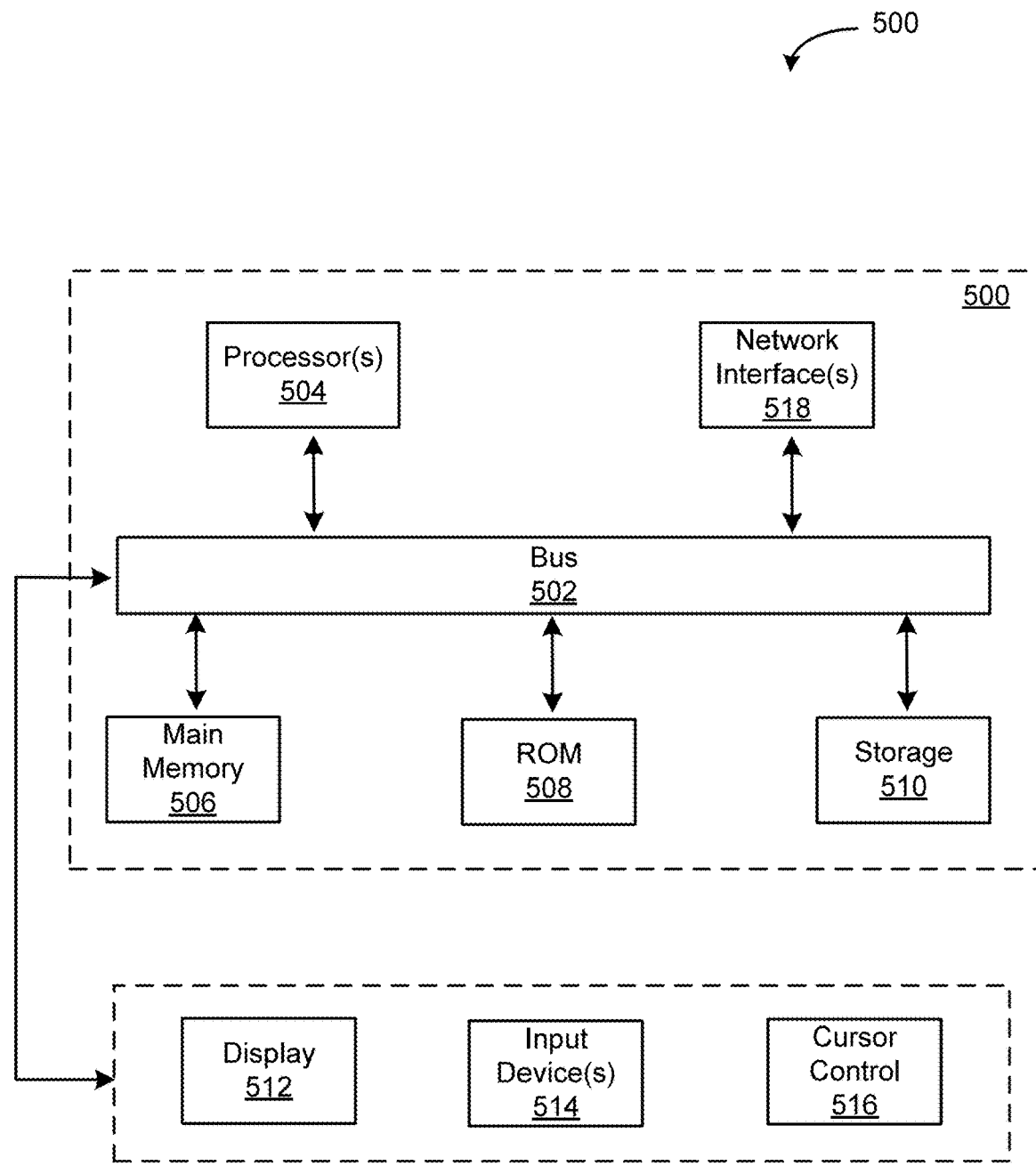
FIG. 5 is an example computing component that may be used to implement various features of examples described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for forwarding client traffic comprising:
   in response to a client device connecting to a Local Area Network (LAN) access point (AP), wherein the LAN AP comprises an authenticator for the client device, creating a first client-entry associated with the client device for the LAN AP to indicate that the client device is local to the LAN AP;
   transmitting, from the LAN AP, an authentication request for authenticating the client device to a Wide Area Network (WAN) AP to be forwarded to an authentication server;
   creating a second client-entry associated with the client device at the WAN AP based on the authentication request;
   upon successful authentication of the client device at the authentication server, designating the second client-entry as being foreign to the WAN AP based on the first client-entry being local to the LAN AP; and
   analyzing data packets from the client device via a first firewall of the LAN AP, while bypassing a second firewall of the WAN AP, the bypassing of the second firewall occurring based on the foreign designation of the second client-entry at the WAN AP.

2. The method of claim 1, wherein the authentication server comprises a Remote Authentication Dial-In User Service (RADIUS) server.

3. The method of claim 2, wherein the WAN AP comprises a RADIUS-proxy.

4. The method of claim 1, further comprising designating the first client-entry as being local to the LAN AP.

5. The method of claim 1, further comprising downloading a first user role associated with the second client-entry and activating the second client-entry upon successful authentication of the client device.

6. The method of claim 5, further comprising downloading a second user role associated with the first client-entry and activating the first client-entry upon activation of the second client-entry.

7. The method of claim 1, further comprising:
   in response to a second client device connecting to a second LAN AP, authenticating the second client device at the authentication server;
   designating a client-entry of the second client device as foreign to the WAN AP; and
   analyzing data packets from the second client device via a third firewall of the second LAN AP, while bypassing the second firewall of the WAN AP.

8. The method of claim 7, wherein additional data packets from additional client devices bypass the second firewall of the WAN AP if the additional client devices are authenticated by a LAN AP.

9. A non-transitory machine-readable medium encoded with instructions, which when executed, cause a processor to:
   in response to a client device connecting to a LAN AP, wherein the LAN AP comprises an authenticator for the client device, create a first client-entry associated with the client device for the LAN AP;
   transmit, from the LAN AP, an authentication request for authenticating the client device to a WAN AP to be forwarded to a RADIUS server;
   create a second client-entry associated with the client device at the WAN AP based on the authentication request;
   upon successful authentication of the client device at the RADIUS server, designate the second client-entry as being foreign to the WAN AP; and
   analyze data packets from the client device via a first firewall of the LAN AP, while bypassing a second firewall of the WAN AP, the bypassing of the second firewall occurring based on the foreign designation of the second client-entry at the WAN AP.

10. The non-transitory machine-readable medium of claim 9, wherein the WAN AP comprises a RADIUS-proxy.

11. The non-transitory machine-readable medium of claim 9, wherein the instructions further cause the processor to designate the first client-entry as being local to the LAN AP.

12. The non-transitory machine-readable medium of claim 9, wherein the instructions further cause the processor to download a first user role associated with the second client-entry and activate the second client-entry upon successful authentication of the client device.

13. The non-transitory machine-readable medium of claim 12, wherein the instructions further cause the processor to download a second user role associated with the first client-entry and activate the first client-entry upon activation of the second client-entry.

14. The non-transitory machine-readable medium of claim 9, wherein the instructions further cause the processor to:
   in response to a second client device connecting to a second LAN AP, authenticate the second client device at the RADIUS server;
   designate a client-entry of the second client device as foreign to the WAN AP; and
   analyze data packets from the second client device via a third firewall of the second LAN AP, while bypassing the second firewall of the WAN AP.

15. The non-transitory machine-readable medium of claim 14, wherein additional data packets from additional client devices bypass the second firewall of the WAN AP if the additional client devices are authenticated by a LAN AP.

* * * * *